E. WITZENMANN.
BRAKE PIPE FOR RAILWAY CARS AND THE LIKE.
APPLICATION FILED JULY 25, 1911.
1,044,962. Patented Nov. 19, 1912.
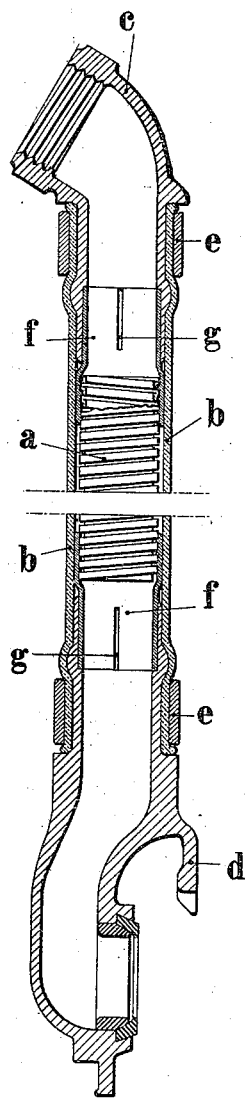

UNITED STATES PATENT OFFICE.

EMIL WITZENMANN, OF PFORZHEIM, GERMANY.

BRAKE-PIPE FOR RAILWAY-CARS AND THE LIKE.

1,044,962. Specification of Letters Patent. Patented Nov. 19, 1912.

Application filed July 25, 1911. Serial No. 640,496.

*To all whom it may concern:*

Be it known that I, EMIL WITZENMANN, manufacturer, a subject of the Grand Duke of Baden, residing at No. 48 Holzgartenstrasse, Pforzheim, German Empire, have invented new and useful Improvements in Brake-Pipes for Railway-Cars and the Like, of which the following is a specification.

This invention relates to brake pipes adapted for railway cars and the like and consisting in substance of a so-called spiral metallic hose, that is a hose formed of a spirally-wound metal tape of suitable cross section, and of a rubber hose inclosing such metal hose.

My invention has for its object to provide a device of this nature in which the rubber hose shall be perfectly protected from the action of the medium passing through the pipe so as to prevent the possibility of the rubber hose being injured and causing disturbances, such, for example, as stopping up of valves, by particles detached from the rubber hose.

Another object of this invention consists in arranging the brake pipe so that the connecting pieces as well as the rubber hose hitherto used may be employed without requiring any alterations, while the device shall be most reliable in action.

To such end my improvements consist, broadly, in providing the metal hose with resilient sleeves closely fitting into the said connecting pieces so as to prevent the medium passing through the brake pipe from having access to the rubber hose.

The invention will be fully understood from the following description and be particularly pointed out in the appended claims, reference being had to the accompanying drawing which shows a sectional view of a device embodying my improvements.

As will appear from this drawing the metal hose $a$ carries a sleeve $f$ at each end thereof, attached thereto by soldering or the like. These sleeves fit closely into the well-known connecting pieces $c$, $d$ of the brake pipe and are preferably provided to such end with longitudinal slots $g$ which impart a certain resiliency to the sleeves. The well-known rubber hose $b$, held in position by rings $e$ or the like, incloses the connecting pieces $c$, $d$, the sleeves $f$, and the metal hose $a$.

It will be seen that the sleeves $f$ together with the metal hose $a$ entirely separate the rubber hose $b$ from the interior of the brake pipe so that the medium passing therethrough will have no access to the rubber hose.

While the connecting piece $c$ is shown to be of a curved shape it may also have any other form adapted for the purpose.

It is to be understood that also other changes may be made in the form, proportion, size, and the minor details without departing from the spirit or sacrificing any of the advantages of this invention.

What I claim is:

1. In a brake pipe the combination with a metal hose, connecting pieces forming the ends of the brake pipe, and a rubber hose, inclosing the said metal hose as well as the said connecting pieces, of resilient sleeves fixed to the ends of the metal hose and fitting closely into the connecting pieces, substantially as described.

2. In a brake pipe the combination with a metal hose, connecting pieces forming the ends of the brake pipe, and a rubber hose, inclosing the said metal hose as well as the said connecting pieces, of sleeves attached to the ends of the metal hose and having longitudinal slots, such sleeves fitting closely into the connecting pieces, substantially as specified.

In witness whereof I have hereunto signed my name this 6th day of July A. D. 1911, in the presence of two subscribing witnesses.

EMIL WITZENMANN.

Witnesses:
 ERNEST ENTENMANN,
 FRIDE. KLAIBER.

Copies of this patent may be obtained for five cents each, by addressing the "Commissioner of Patents, Washington, D. C."